March 24, 1931.      J. A. WILEY      1,797,744

SELF SCORING DEVICE FOR TESTS

Filed Sept. 27, 1929      2 Sheets-Sheet 1

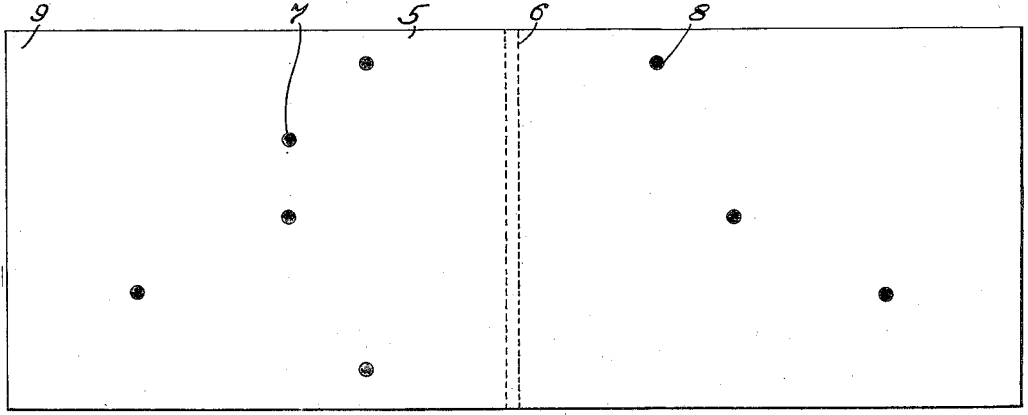

Fig. 2.

(1) The capital city of the State of Iowa is:
    (a) Ottumwa.
    (b) Iowa City.
    (c) Davenport.
  x (d) Des Moines.
    (e) Waterloo.

(2) The most reliable indication that a particular human trait is native is:
    (a) Universality.
  x (b) Present at birth.
    (c) Value to the species.
    (d) Presence in primates.
    (e) Appearance without a chance to learn.

(3) When a single stimulus causes reaction in several sets of muscles, we say that the impulse has become:
    (a) Inhibited.
    (b) Facilitated.
  x (c) Diffused.
    (d) Strengthened.
    (e) Converged.

(4) All parts of the eye are accessory except:
    (a) The retina.
    (b) The lens.
    (c) The iris.
  x (d) The cornea.
    (e) The pupil.

(5) When the organism as a whole is directed toward an object of attention, the action is spoken of as:
    (a) Voluntary.
    (b) Automatic.
    (c) Learned.
    (d) Diffuse.
  x (e) Integrated.

Fig. 1.

INVENTOR
James A. Wiley,
BY
ATTORNEY

March 24, 1931.  J. A. WILEY  1,797,744
SELF SCORING DEVICE FOR TESTS
Filed Sept. 27, 1929    2 Sheets-Sheet 2
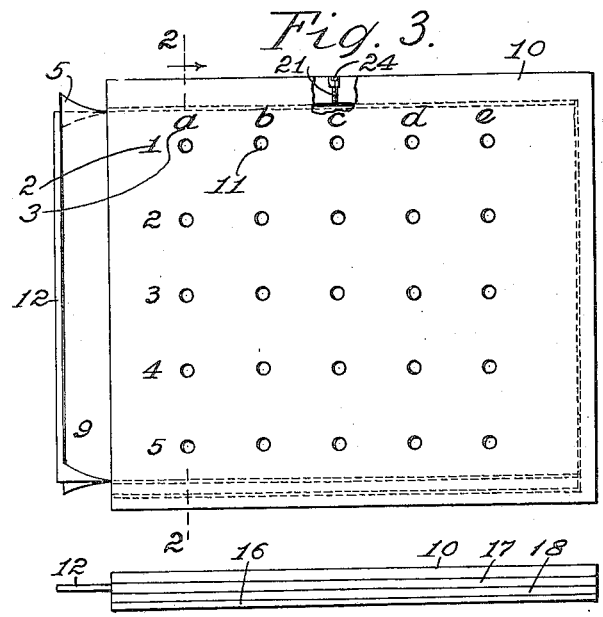
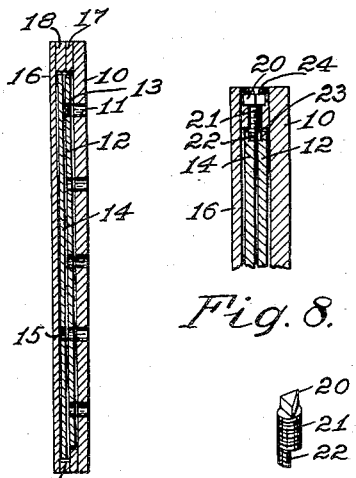
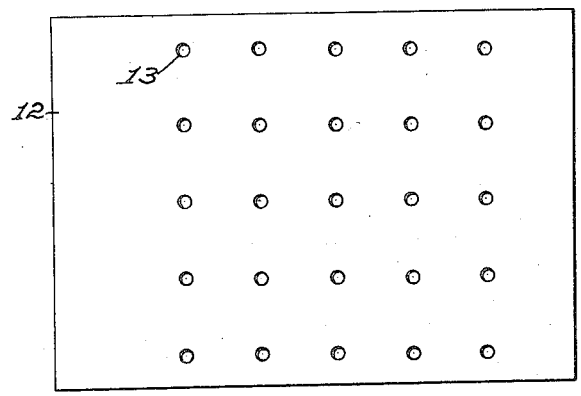
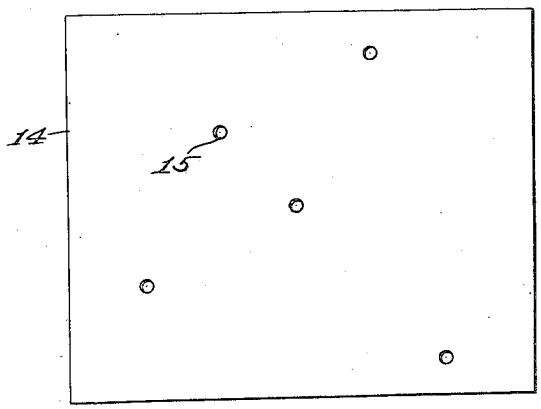
INVENTOR
James A. Wiley,
BY G. C. Kennedy
ATTORNEY Patented Mar. 24, 1931

1,797,744

UNITED STATES PATENT OFFICE

JAMES A. WILEY, OF CEDAR FALLS, IOWA

SELF-SCORING DEVICE FOR TESTS

Application filed September 27, 1929. Serial No. 395,591.

My invention relates to improvements in testing means, and the object of my improvement is to furnish means to examiners for giving tests, whereby correct answers only may be non-disclosingly permanently recorded by the subject upon a receiving sheet, economizing time and effort in the checking of such answers and the entering of the final result of the test.

This object I have accomplished by the means which are hereinafter described and claimed, and which are illustrated in the accompanying drawings, in which Fig. 1 is a representation of a questionary sheet containing both questions and certain types of related answers therefor which latter are to be considered and one selected to be then recorded non-disclosingly upon a receiving sheet by a subject of a test. Fig. 2 is a representation of said receiving sheet, showing on opposite parts thereof the recording indications of the selected answers to said questions. Fig. 3 is a top plan of my improved device for the making of such selected answer indications on the receiving sheet. Fig. 4 is a side elevation of said device. Fig. 5 is a top plan of the removable slide of said device apertured to register with all the apertures of the top plate or cover of the device. Fig. 6 is a top plan of another apertured slide to be removably positioned in the device between the first mentioned apertured slide and the bottom plate or part of the device, and whose apertures are less in number than, and to register with, certain apertures only of the top plate and the said uppermost slide. Fig. 7 is a transverse section of the device taken on the broken line 7—7 of said Fig. 3, but without the inserted recording or receiving sheet shown in Fig. 1. Fig. 8 is a fragmentary and enlarged view in transverse section of the upper side of the device, showing the fastening screw for releasably engaging the two apertured slides while in the casing. Fig. 9 is a perspective view of said fastening screw, and Fig. 10 is a perspective view of a puncturing stylus which may be used by a subject in puncturing the said receiving sheet while the sheet is inclosed in said device.

My device is particularly adapted for use by examiners or others in the non-disclosing permanent recording of a certain kind of answers to related questions on a questionary, whereby the said answer indications on a receiving sheet may be discerned at a glance for rapid and easy checking up of a number of such receiving sheets made in an examination for any purpose. However, the device and the method of its employment are peculiarly suited for the uses of such examinations or tests in institutions of learning, or in employment offices.

My invention is not restricted to the precise construction and arrangement of parts herein shown and described, nor to their relative dimensions or details, as the same may be modified or rearranged in various particulars without departing from the spirit and scope of my invention, one practical embodiment of which has been illustrated and described without attempting to show all of the various forms and modifications in which my invention might be embodied.

In Fig. 1 is shown a questionary 1 such as is appropriate for a college test. It consists of a single sheet, or one of a set, upon which at 2 are arranged at one side vertically ordinals for a series of test questions, and below each question and at one side vertically arranged are alphabetic successive letters 3 denoting various answers to the related question, of which one answer only is the correct one.

For recording the respective answers to said questions, as selected from the several answers 3 to each, the subject examined is required to use some puncturing tool such as that shown at the stylus 25 of Fig. 10, in perforating a receiving sheet of paper or other frangible or perforable material 5, shown in Fig. 2, and while this sheet is mounted appropriately in a casing or holder shown in Figs. 3 to 9 inclusive.

This casing comprises top and bottom plates 10 and 16 respectively spaced evenly apart by means of spacing fillers or bars 17 and 18, the hollow of the casing being open outwardly to the left for convenience. Superposed slide-plates 12 and 14 are slidable into or out of the hollow of the casing in superposed relation, and loosely separated from each other and the abutting faces of the top and bottom plates 10 and 16.

The upper slide 12 is slightly narrower transversely than the lower slide 14, the bottom filler part 19 (see Fig. 7) being narrower than the abutted filler 17 to permit fitting said slides thereto, and for convenience in inserting the slides, as each will enter only its appropriated part of the interspace of the casing.

At the top edge of the casing, as best shown in Fig. 8, a small pit or cavity 24 is made in the top filler bars 17 and 18, entering them equally, and having a smaller interiorly threaded opening through the said bars, as the whole casing and slides are preferably constructed of metal, and to receive a screw 21, the lower part of which has a half segment removed at 22, the screw having a triangular or other shaped head part 20. The abutting top edges of the slides 12 and 14 have facing short nearly semi-cylindrical cavities 23 which taken together with a narrow width interspace between the slides to receive the sheet 5, provides a cylindrical cavity or socket to receive the segmental end part 22 of the screw. This screw serves as a means for fastening the slides 12 and 14 to the said casing, locking the device after the receiving sheet 5 has been bent or transversely creased as shown at the dotted lines 6 in Fig. 2, medially, so as to wrap the sheet about the upper and lower faces equally of the upper slide 12, with the bend at the right hand, before the combined sheet 5 and slide 12 are inserted into the casing. The sheet 5 is of a length sufficient to provide an end part 9 overlying the projecting part of the slide 12, this slide being to that extent wider than the lower slide 14, and the sheet margin 9 may receive the name of the student and other desirable data relating to the examination, such data being inserted after the assemblage of the device has been effected and the slides have been fastened by means of said screw 21. The screw when thus secured, has its termination 22 turned so as to engage opposite longitudinal edges of the part 22 with and in the half sockets 23 of the slides, with the bottom of the part 22 compressed against the bottoms of the half-sockets 23 of both slides. The screw thus placed, has its head 20 a little lower than the opening of the outer socket 24, and therefore this together with the triangular shape of the head, renders it difficult for the examinee to release the screw to remove the sheet 5.

By means of a fitting key the examiner may remove the slides by rotating the screw a one quarter turn to release one slide, which may then be removed separately, and a further turn of the screw may be made to release the other slide.

The top plate 10 of the casing and also the upper slide plate 12 have a plurality of holes as at 11 in the plate 10 and the holes 13 in the slide 12, which are positioned to register when the slide is assembled. The cover plate 10 has at the left side a vertical row of ordinals 2, the same as shown on the questionary 1 to indicate the same questions and in line with horizontal rows of the holes 11, and the plate 10 also has a horizontal row of alphabetic characters at 3 which are the same as shown by the same characters on the sheet 5, indicating the vertical rows of holes 11 beneath the answers to said questions.

The lower slide plate 14, however, has a less number of holes 15 therein, predetermined for the purposes of the one sheet of questions and answers 1. This slide 14 may be exchanged for another prepared for use likewise for a different sheet 1 of questions 2 and various answers 3. The apertures or holes 15 in the slide 14 refer only to the correct answer in each case for each question. I have for reference marked the correct answer to each question on the questionary 1 by a character $x$, but it will be understood that this character $x$ does not appear on the sheet in fact. When the slide 14 is assembled with the slide 12 in said casing, the holes 15 register with the appropriate holes 13 and 11 in the slide 12 and the top plate 10.

The student or examinee may then insert the stylus 25 in one only of each horizontal row of holes in the top plate 10, pressing the stylus down firmly to puncture the upper flap or part of the sheet 5 which is between the top plate 10 and the slide 12, the stylus thus coming into contact with an unperforated part of the sheet 5 upon the lower slide 14 in case the answer is a wrong one, as selected by the student. Therefore no puncture is effected in the lower flap of the sheet 5. In case the student has selected a correct answer, as all the holes 11, 13 and 15 in the elements 10, 12 and 14 respectively are in registration, the right hand or under part of the sheet 5 is punctured. In Fig. 2 are indicated by blackened places 7 and 8 respectively, the whole number punctured in the left hand part and the correct answers only at 8, to the right.

In instructional situations this machine may be used as an efficient aid to teaching. In this use, the teacher can pass out the machines and appropriate questions for pupils to use during regular study time or during recitation time. When a pupil has studied the section to which a particular question applies, he will look over the suggested answers for that question and choose the answer which he thinks most appropriate. Then he will punch the corresponding hole on the test machine. As soon as he punches the hole he will know whether he has the right answer, for when he punches a right hole his punching instrument will go down into the machine nearly twice as far as when he punches a wrong hole.

When he punches the right hole he not only knows immediately that he is right, but he also has the satisfaction of success (law of effect) closely associated with the right response. Both of these factors are powerful aids to learning. In case he fails to punch the correct answer, he may re-read the question, the discussion, the answers, do further thinking, and then punch for the next most likely answer. By many similar procedures a pupil can check up his mastery of the lesson in various ways while studying or reciting. Likewise, the teacher can use the machine in a similar way to serve as an interesting means for initiating discussion of important points in lessons. After each pupil has used the machine to locate the correct answer and the incorrect answers to a particular question, the teacher may proceed by a further discussion and study of the questions then arising, if desired.

When the examiner has later disassembled the device, and removed the receiving sheet 5 as thus punctured, the number of correct answers are found at 8 on the right hand part of each sheet, and but a glance is needed for their counting. This saves time and mental labor for the examiner in checking up numerous sheets.

As the holes in the device are small, it is not possible for another student to learn the location of the correct punctures at 8 on sheet 5, and as the student being examined cannot by an exploratory action with the stylus 25 determine by slight pressure upon the upper flap of the sheet 5 whether the hole 11 of the plate 10 is registering with the correct hole 15 of the slide 14, such cheating if resorted to is prevented.

Since a second slide plate 14 with a different arrangement of predetermined holes to match with a different arrangement or transposition of correct answers on Sheet 1 may be substituted at will, all chance of profiting by memorizing the lettering or positions of the correct answers may be removed by such a change in forms. These protective features prevent cheating.

The device shown, and for the purpose of convenient display in the drawings, is of a size and shape providing for the recording of answers for a limited number of questions only, but it is obvious that in practice, the device may be enlarged to thus provide for a large number of apertures as may be needed in some cases.

Having described my invention, what I claim as new, and desire to secure by Letters Patent, is:

1. In combination, plates, the uppermost and lowermost connected peripherally except at one side to provide an open end casing, a set of superposed slightly spaced slides mounted removably in said casing and also spaced slightly from the top plate to receive in their interspaces parts of a puncturable and doubled sheet folded about the upper slide, the top casing plate and the top slide having like registering pluralities of apertures, the lower slide abutting said imperforate casing plate having a less number of like apertures registering in a predetermined order with registering apertures in the upper casing plate and the upper slide, and means for releasably securing said slides in said assemblage with the casing plates.

2. In combination, a questionary having inscribed questions thereon, with a plurality of answers inscribed thereon for each question, but one answer to each question being correct, and a device whose fixed upper element has apertures related to said questions and all the answers, containing a like removable element having apertures all registering with the said apertures in the upper element, containing also a like removable element having a less number of like apertures in a predetermined order of arrangement and registering with alined registering apertures in said other elements, and said device having an imperforate fixed bottom plate beneath said second removable element, the upper fixed and the pair of slidable elements being slightly spaced, and a record receiving sheet doubled about the upper removable element when inserted in said device, and means for securing said removable elements releasably to the fixed elements, the apertures punctured in the lower flap of said sheet denoting the correct answers only to said questions.

3. In combination, for use with a stylus and with a questionary having inscribed questions thereon, with a plurality of answers inscribed thereon for each question, but one answer to each question being correct, a device consisting of spaced upper and lower plates closed all around except at one side by filler spacing elements, the spacing filler one element rabbeted along its inner face, a pair of superposed slides removably mounted in the hollow of said device, to slidably fit said elements, the wider slide being uppermost and projecting at one side from the device, means for releasably locking said slides in the device, the upper plate and the upper slide having identically arranged and registering pluralities of restricted apertures, representing all the answers to said questions, the lower plate being imperforate, and the lower slide having a limited number of apertures registering with certain of the registering apertures in the upper plate and the upper slide, the interspaces being narrow between the slides and between the upper slide and the upper plate, a puncturable sheet doubled about the upper slide with its fold inwardly and an upper end part positioned upon the outwardly projecting side part of the upper slide, said apertures being adapted to receive a stylus which traverses them in the puncturing of one or both of said sheet parts according to the relative registration of the apertures in the top plate and both slides, the apertures punctured in the lower flap of said sheet by the stylus denoting only the correct answers to said questions.

4. In combination, an imperforate base member, a tier of three plates superposed thereon, the upper two plates having like registering apertures, the plate between them and said member having a less number of apertures registering with like positioned apertures in said two plates thereabove, and a folded over puncturable sheet having its parts respectively seated removably between said upper two plates, and between the second and third plates from the top.

5. In means for scoring tests, a like superposed pair of members with registering apertures, another and separable member therebelow having apertures registering with certain ones only of the registering apertures in said pair of members, and a puncturable sheet bendable to provide two leaves which are adapted to be removably seated respectively between said pair of members and between said pair of members and the lowermost member.

6. In means for scoring tests, three slightly spaced apertured members, with the apertures in registration, the apertures of the lowermost member registering with certain ones only of the registering apertures in the other members thereabove, and the lowermost member being removable from the others to be exchangeable for a member having an arrangement of such apertures therein for registration with certain registering apertures in the other members.

In testimony whereof I affix my signature.

JAMES A. WILEY.